United States Patent
Thai et al.

(10) Patent No.: US 7,623,639 B2
(45) Date of Patent: Nov. 24, 2009

(54) SYSTEM AND METHOD OF PROVIDING NUMBER IDENTIFICATION IN AN INTELLIGENT TELEPHONE NETWORK

(76) Inventors: Tuan Thai, 2244 E. 20th St., Oakland, CA (US) 94606; Elizabeth Smith, 4914 Rebel Rd., San Diego, CA (US) 92117; Dimitris Karagiannis, 85 Bunce Meadows, Alamo, CA (US) 94507; Anup D. Karnalkar, 305 Beacon Hill Dr., Allen, TX (US) 75013

( * ) Notice: Subject to any disclaimer, the term of this patent is extended or adjusted under 35 U.S.C. 154(b) by 933 days.

(21) Appl. No.: 11/092,966

(22) Filed: Mar. 29, 2005

(65) Prior Publication Data

US 2006/0227955 A1    Oct. 12, 2006

(51) Int. Cl.
*H04M 1/56* (2006.01)
*H04M 15/06* (2006.01)

(52) U.S. Cl. .......................... 379/142.04; 379/142.02; 379/142.09; 379/142.14; 379/114.24

(58) Field of Classification Search ............ 379/142.01, 379/142.02, 142.03, 142.04, 142.1, 142.17, 379/245, 247, 114.24, 142.09, 142.14
See application file for complete search history.

(56) References Cited

U.S. PATENT DOCUMENTS

| | | | |
|---|---|---|---|
| 5,799,073 A | * | 8/1998 | Fleischer et al. ........ 379/112.01 |
| 7,499,536 B2 | * | 3/2009 | Boeckman et al. ..... 379/210.01 |
| 2005/0043066 A1 | * | 2/2005 | Seo ............................. 455/567 |
| 2005/0044243 A1 | * | 2/2005 | Narayanan et al. .......... 709/229 |
| 2005/0259804 A1 | * | 11/2005 | Bedingfield ............ 379/211.02 |
| 2007/0121855 A1 | * | 5/2007 | Tiliks et al. ............ 379/142.01 |

* cited by examiner

*Primary Examiner*—Binh K Tieu
(74) *Attorney, Agent, or Firm*—Toler Law Group

(57) ABSTRACT

A method of managing calls to a toll free telephone number is provided and includes receiving a telephone call directed to a toll free number and determining a day that the telephone call is received. Further, the method includes modifying a Calling Party ID privacy indicator associated with the call. The Calling Party ID privacy indicator can be modified based on the day that the telephone call is received. Also, the caller identification can be determined after the Calling Party ID privacy indicator is modified. Further, in a particular embodiment, the call is received and the Calling Party ID privacy indicator is modified on a weekday. The method further includes determining whether the call is received within a predetermined time range. Moreover, the Calling Party ID privacy indicator can be modified when the call is received within the predetermined time range.

33 Claims, 4 Drawing Sheets

SYSTEM AND METHOD OF PROVIDING NUMBER IDENTIFICATION IN AN INTELLIGENT TELEPHONE NETWORK

FIELD OF THE DISCLOSURE

The present disclosure relates generally to telephone caller identification services.

BACKGROUND

Caller identification is a telephone service that permits the recipient of an incoming call to determine the number from which the incoming call is being placed before the call is answered. Typically, the caller identification information, e.g., the caller's name and telephone number, are displayed at the recipient's telephone or another device attached to the telephone line. Caller identification is a service that is usually purchased by telephone subscribers in order to identify incoming calls.

Caller identification restriction, on the other hand, is a service that enables a caller to prevent his or her telephone number from being displayed at a recipient device. Caller identification restriction is typically a feature that is purchased by telephone subscribers in order to prevent their telephone numbers from being publicized as telephone calls are made.

Businesses have a great interest in collecting telephone numbers. Telephone numbers can be collected each time someone calls a toll free number. The collected telephone numbers and the demographic information that can be compiled based on the collected telephone numbers are important to marketers when trying to reach particular target markets. Collecting telephone numbers can be quite easy using caller identification services, unless a caller subscribes to a caller identification restriction service. In the case of a caller with caller identification restriction, the holder of the toll free number may be unable to obtain the telephone number of the person calling the toll free number.

Accordingly, there is a need for an improved system and method for providing caller identification privacy override.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF THE DRAWINGS

A method of managing calls to a toll free telephone number is disclosed and includes receiving a telephone call directed to a toll free number and determining a day that the telephone call is received. Further, the method includes modifying a Calling Party ID privacy indicator associated with the call.

In a particular embodiment, the Calling Party ID privacy indicator is modified based on the day that the telephone call is received. Also, the caller identification is determined after the Calling Party ID privacy indicator is modified. Further, in a particular embodiment, the call is received and the Calling Party ID privacy indicator is modified on a weekday.

In a particular embodiment, the method further includes determining whether the call is received within a predetermined time range. Moreover, the Calling Party ID privacy indicator is modified when the call is received within the predetermined time range. The method also includes determining whether a Caller ID service setting associated with the toll free number is set to enable, disable or pass. When the Caller ID service setting is set to enable, the Calling Party ID privacy indicator is modified in a way such that the receiving end is allowed to display the calling party information of the call. On the other hand, when the Caller ID service setting is set to disable, the Calling Party ID privacy indicator is modified in a way such that the receiving end is NOT allowed to display the calling party information of the call. Additionally, when the Caller ID service setting is set to pass, a default Calling Party ID privacy indicator received with the telephone call is utilized.

In another embodiment, a method of modifying a caller identification privacy parameter is provided and includes receiving an SS7 query message and selectively modifying one or more parameters in a response to the query message in order to allow an identification of a caller based on a Caller ID privacy override (CPO) module.

In yet another embodiment, a telephone system is provided and includes a service control point, a service control point database accessible to the service control point and a service switching point. A computer program is embedded within the service control point. The computer program includes instructions to modify a Calling Party ID privacy indicator within a query message associated with a telephone call to a toll free number.

Figure 1:
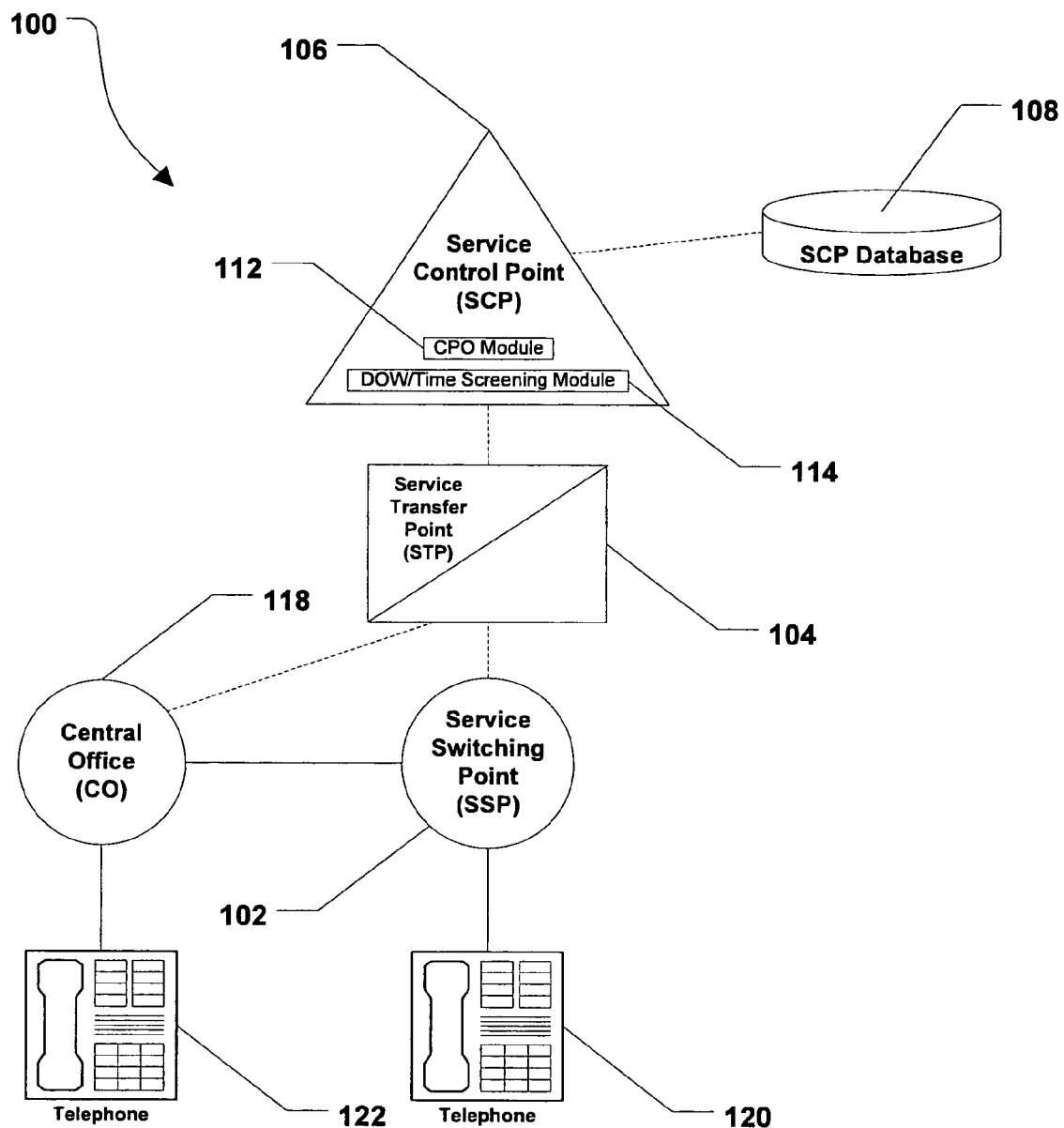
FIG. 1 is a diagram of an exemplary telephone system.

Referring initially to FIG. 1, an exemplary, non-limiting embodiment of a telecommunications system is illustrated and is generally designated 100. As depicted in FIG. 1, the system 100 includes a service switching point (SSP) 102 to which a signal transfer point (STP) 104 is connected and communicates therewith. In a particular embodiment, a service control point (SCP) 106 is connected to the STP 104. Moreover, an SCP database 108 is connected to the SCP 106. As shown in FIG. 1, the SCP 106 can include a Caller ID privacy override (CPO) module 112 and a day-of-week (DOW) time screening module 114.

In a particular embodiment, information related to the called party can reside within the SCP database 108. Further, in a particular embodiment, the CPO module 112 can allow the SCP 106 to override a Calling Party ID privacy indicator associated with a calling party's telephone number when the called party subscribes to a CPO service and has the CPO service set to enable. Also, the DOW/time screening module 114 can determine the day of the week that a particular telephone call is made and the time of day that the telephone call is made. As such, a subscriber to the CPO service can choose to override Calling Party ID privacy indicators only on weekdays and only during regular business hours. In the case that the owner of a particular toll free number is charged on a per call basis for the CPO service, this time and day selection feature can prevent the owner from being charged for calls that are not received when someone is present to view caller identification information.

FIG. 1 further shows a central office (CO) 118 that are connected to the SSP 102. Additionally, a representative called telephone station 120 is connected to the SSP 102 and a representative calling telephone station 122 is connected to the CO 118. In an exemplary embodiment, the system 100 shown in FIG. 1 can further include intelligent network system components, commonly referred to as advanced intelligent network (AIN) components, that are suitable for implementing one or more of the logic steps described below. The AIN components are commercially available from several vendors and can be used to implement computer program code.

Specifically, in a particular embodiment, the SSP 102 can include an AIN switch that routes calls, recognizes and responds to triggers, generates queries to obtain call information and responds to returned call information. The SSP 102 can connect the called telephone station 120 with the CO 118 in order to enable communication between called telephone station 120 and calling telephone station 122. Moreover, in a particular embodiment, the SSP 102 communicates with the SCP 106 and the CO 118 by utilizing the signaling protocol Signaling System 7 (SS7). In an illustrative embodiment, the SSP 102 and the SCP 106 communicate using transaction capabilities applications protocol (TCAP).

In a particular embodiment, the SSP 102 generates query messages to the SCP 106 and receives and responds to responses to the response messages returned from the SCP 106. Using the SS7 protocol a query message can be an Info_Collected message or an Info_Analyzed message. Also, a response message can be an Analyze_Route message. Further, the query message can include a Calling Party ID that can include one or more parameters such as a Calling Party ID digits field, a Calling Party ID privacy indicator, a Calling Party ID nature of address field, a Calling Party ID numbering plan field, and a Calling Party screening indicator. The query message can also include a Charge Number that can include one or more parameters such as a Charge Number digits field, a Charge Number nature of address, and a Charge Number numbering plan. In an exemplary embodiment, the CPO module 112 can modify one or more of those parameters and include the modified or unmodified parameters in a response message that is generated in response to the query message.

In a particular embodiment, the Calling Party ID digits field can include the telephone address of the calling party. Further, the Calling Party ID privacy indicator is an indication of whether the identity of the calling party should be disclosed to a called party. For example, a value of 00 would indicate that the identity of the calling party can be disclosed and a value of 01 would indicate that the identity of the calling party cannot be disclosed. The Calling Party ID nature of address field indicates whether an address, e.g., the calling party address, is for national use, international user, or other use.

Also, in a particular embodiment, the Calling Party ID numbering plan field indicates to which plan the address belongs, such as a plan for the public switched telephone network (e.g., plan E.164), a plan for the mobile telephones network (e.g., plan E.212), a private numbering plan, or an Internet numbering plan. The Calling Party screening indicator field indicates the source of the calling party ID information which may be provided by the source local network for the call or from the calling subscriber. In a particular embodiment, the Charge Number can include the automatic number identification (ANI) of the calling party for billing purposes.

In an illustrative embodiment, the STP 104 can include a network element that transfers signaling communications in response to SS7 messages. The STP 104 transfers queries from the SSP 102 to the SCP 106 and transfers responses to the queries from SCP 106 to SSP 102. Further, the SCP 106 includes an AIN element that can store call information and can receive and respond to queries. In a particular embodiment, the SCP 106 can store call control information in the SCP database 108 and can access the stored call control information.

Also, in a particular embodiment, the SCP 106 can store standard caller identification information in the SCP database 108 and can access the stored caller identification information. When telephone calls are made, the SCP 106 receives queries generated by the SSP 102 and responds to the queries by performing database searches to locate the requested call control information or caller identification information. The SCP 106 can forward the call control information or caller identification information to SSP 102.

Figure 2:
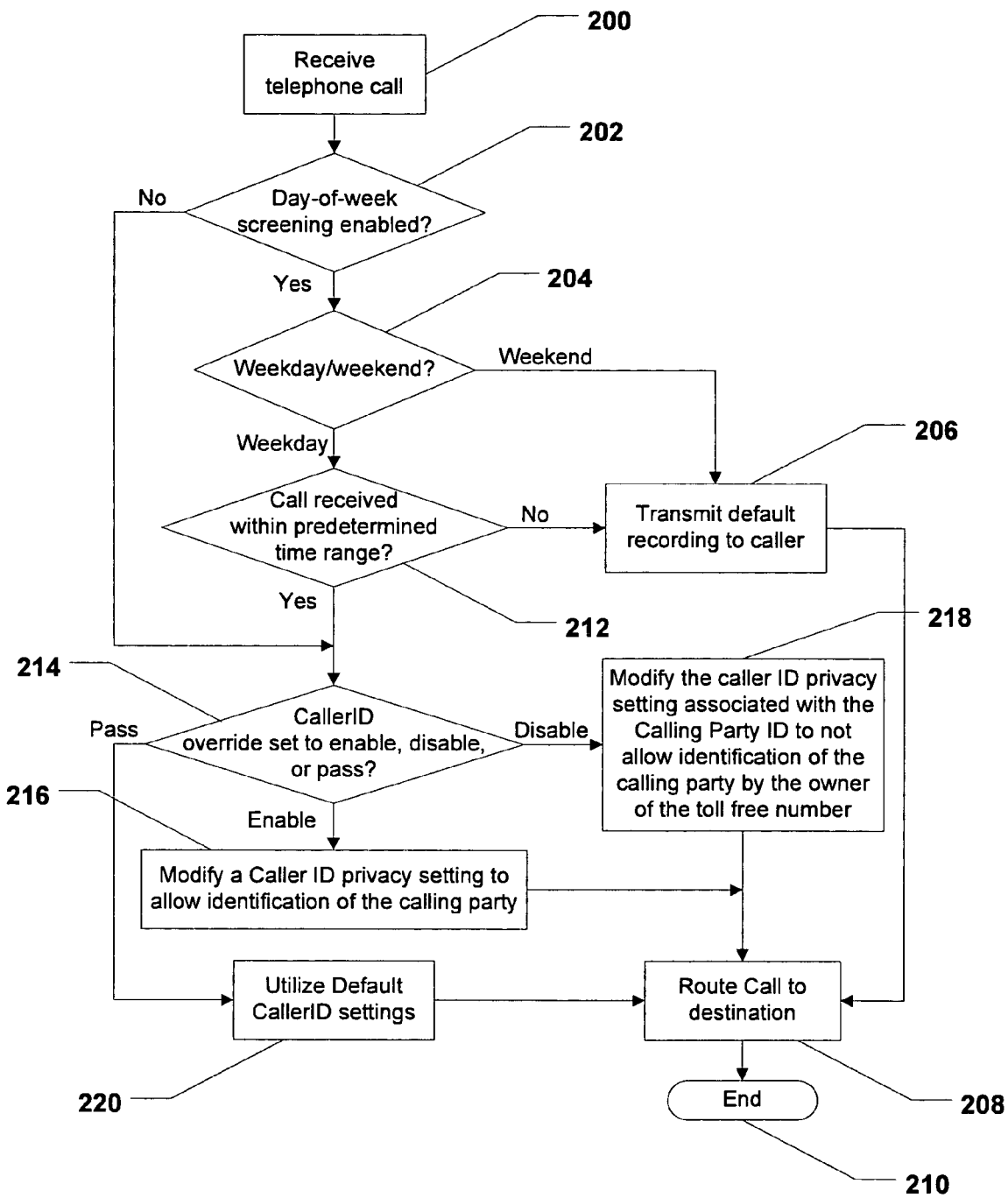
FIG. 2 is a flow chart to illustrate a general method for overriding telephone Calling Party ID privacy indicators.

FIG. 2 shows a method of managing telephone calls to a toll free number. Commencing at block 200, the service control point (SCP) receives a telephone call to a toll free number. At block 202, the SCP determines if day-of-week screening is enabled for the owner of the toll free number called. In a particular embodiment, the DOW/time screening module within the SCP determines whether the day-of-week screening is enabled.

If the day-of-week screening is enabled, the method proceeds to block 204 and the SCP determines if the telephone call is made on a weekday or a weekend. If the call is made on a weekend, a default recording can be transmitted to the caller at block 206. In a particular embodiment, the default recording can indicate that the owner of the toll free number is currently not open for business and that the caller will be forwarded to an answering service, e.g., a human answering service or an automated answering service. At block 208, the call is routed to the destination, i.e., the answering service. The method then ends at state 210.

Returning to decision step 204, if the call is received on a weekday, the method continues to decision step 212. At decision step 212, the SCP determines whether the call is received within a predetermined time range. In a particular embodiment, the DOW/time screening module within the SCP determines the time when the call is received and whether that time is within a predetermined time range. Particularly, the predetermined time range is a time range associated with a normal business day, e.g., from 7:00 AM to 7:00 PM.

If the call is not received within the predetermined time range, the method moves to block 206 and continues as described above. Conversely, if the call is received within the predetermined time range, the method proceeds to decision step 214 and the SCP determines whether a Caller ID override service for the Toll Free Number is set to enable, disable, or pass. In a particular embodiment, the CPO module within the SCP determines the status of the Caller ID override service for the owner of the toll free number.

If the Caller ID override service is enabled, the method proceeds to block 216 and the CPO module within the SCP modifies the Calling Party ID privacy indicator associated with the Calling Party ID to allow identification of the calling party by the owner of the toll free number. For example, if the Calling Party ID privacy indicator is a Calling Party ID privacy indicator that is set to 01, it will be reset to 00 to indicate that the identity of the calling party can be disclosed to the called party. Next, the method moves to block 208 and the SCP routes the call to the final destination, e.g., an agent of the owner of the toll free number. The logic then ends at state 210.

At decision step 214, if the Caller ID override service is disabled, the method proceeds to block 218 and the CPO module within the SCP modifies the Calling Party ID privacy indicator associated with the Calling Party ID to not allow identification of the calling party by the owner of the toll free number. For example, if the Calling Party ID privacy indicator is a Calling Party ID privacy indicator that is set to 00, it will be reset to 01 to indicate that the identity of the calling party cannot be disclosed to the called party. The method then proceeds to block 208 and continues as described above. If the Caller ID override service is set to pass, the method moves to block 220 and the SCP utilizes the default Caller ID settings, e.g., the settings selected by the caller when establishing his or her telephone services. Thereafter, the logic continues to block 208 and the SCP routes the call to the destination. The logic then ends at state 210.

Figure 3:
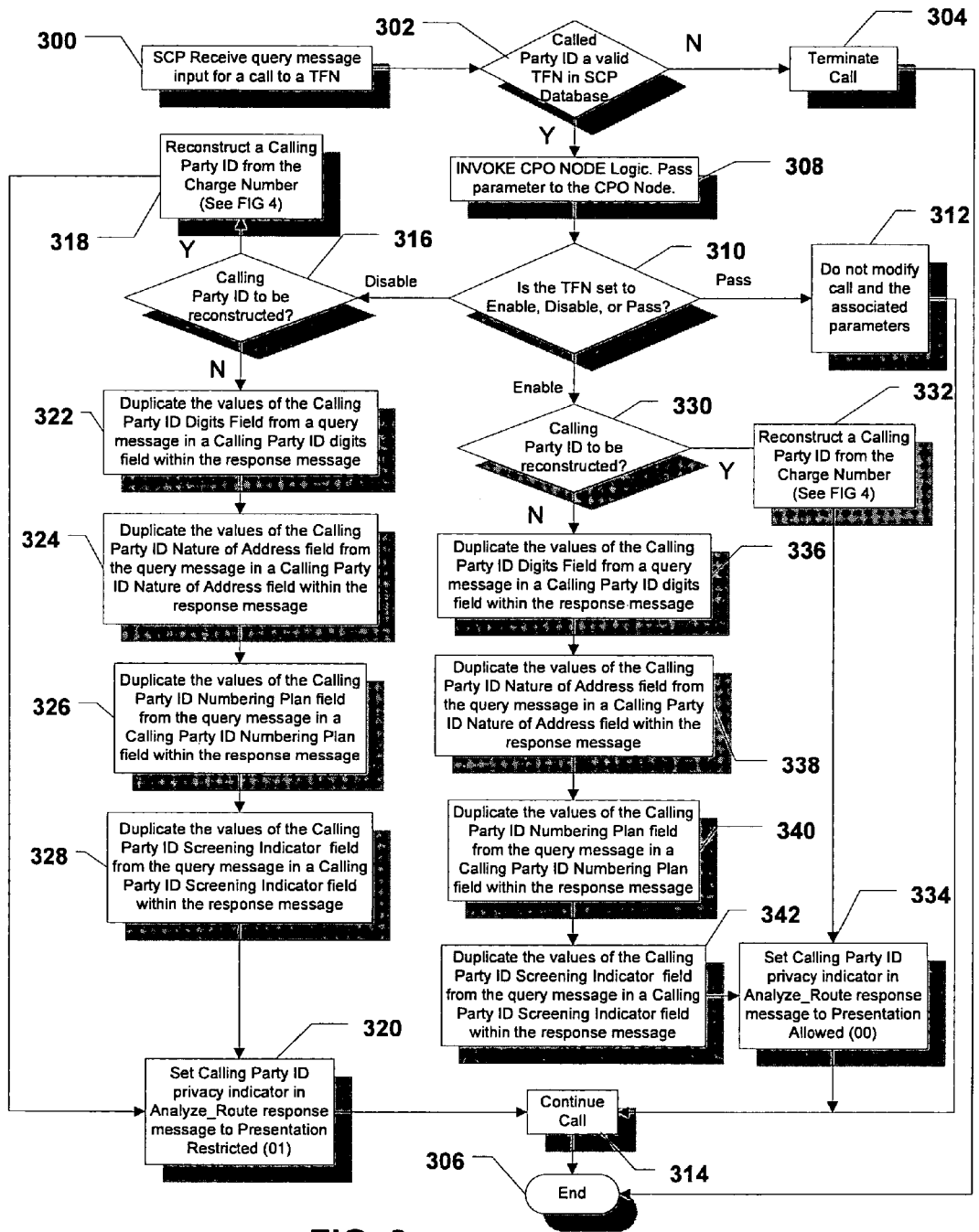
FIG. 3 is a flow chart to illustrate a detailed method for overriding telephone Calling Party ID privacy indicators.

Referring to FIG. 3, a method for overriding caller identification settings is illustrated and commences at block 300 when a Service Control Point (SCP) receives a query message input for a call to a Toll Free Number. At decision step 302, the SCP examines the query message and determines whether the Called Number is a Toll Free Number that exists within the SCP database. If it does not, the method proceeds to block 304 and the SCP terminates the call. The method then ends at state 306.

Returning to decision step 302, if the Toll Free Number exists within the SCP database, the method continues to block 308. At block 308, the SCP invokes the CPO module logic and the SCP passes one or parameters to the CPO module in order to modify a Calling Party ID privacy indicator associated with the calling party.

Proceeding to decision step 310, the CPO module determines whether the Toll Free Number presented as Called Number in the SS7 message input received at the SCP has a Caller ID service setting set to enable, disable, or pass. In a particular embodiment, the CPO module makes this determination by communicating with the SCP database. When the SCP database indicates that the Caller ID service setting for the Toll free number is pass, the method continues to block 312 and the CPO module does not modify the call and its associated parameters. Thereafter, the method proceeds to block 314 and the call continues. The method then ends at state 306.

Figure 4:
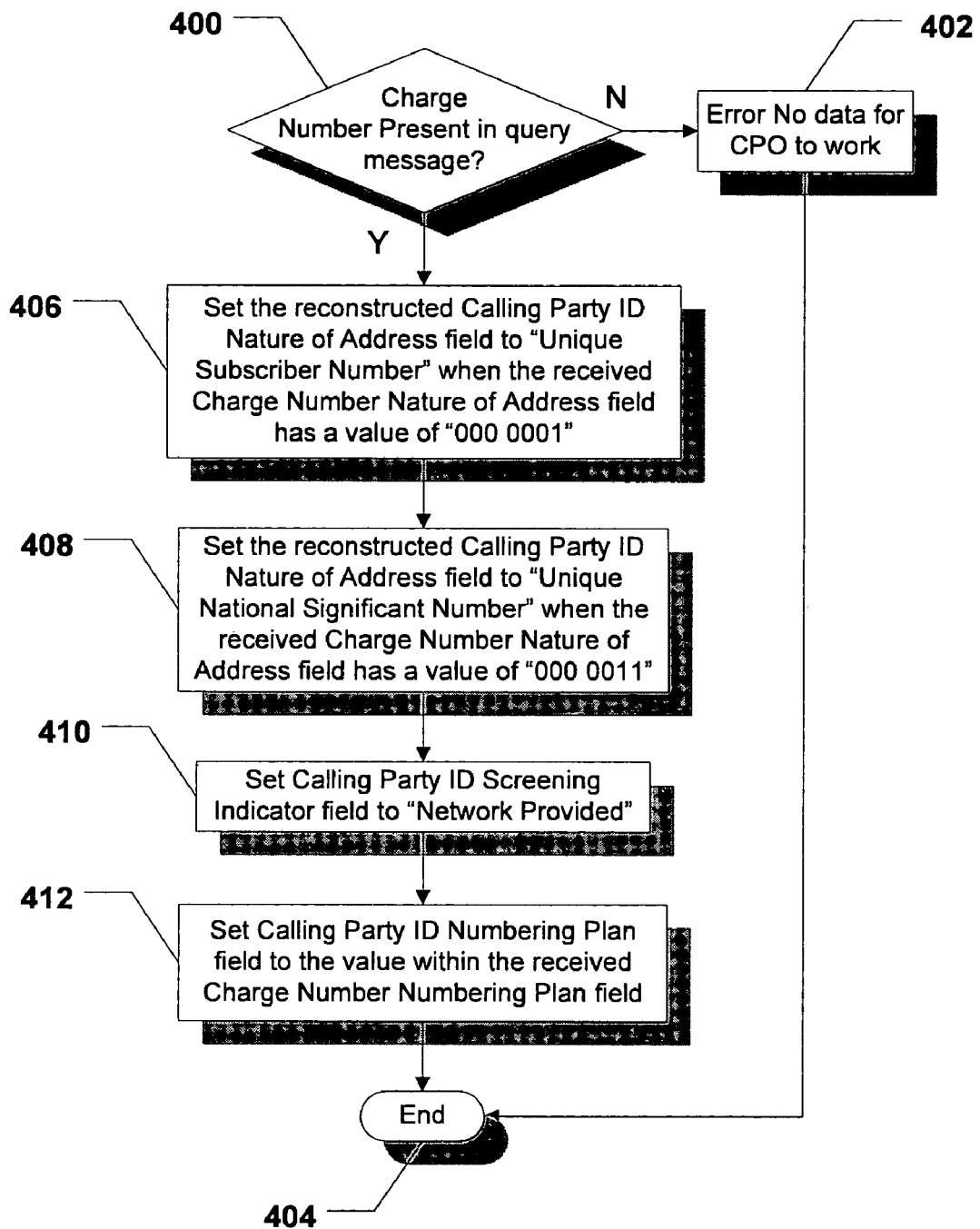
FIG. 4 is a flow chart to illustrate a method of reconstructing a Calling Party ID from a Charge Number.

Returning to decision step 310, when the Caller ID service setting for the Toll Free Number is disable, the method proceeds to decision step 316 and the CPO module determines whether the Calling party ID needs to be reconstructed. If so, the method continues to block 318 and the Calling Party ID is reconstructed from a Charge Number. FIG. 4 depicts an exemplary, non-limiting embodiment of a method of reconstructing the Calling Party ID from the Charge Number. From block 318, the method then proceeds to block 320 and the CPO module sets the Calling Party ID privacy indicator in a Analyze_Route response message of the SCP to Presentation Restricted, e.g., to a value of 01. Thereafter, the method proceeds to block 314 and the call continues. The method then ends at state 306.

Returning to decision step 316, if the Calling party ID does not need to be reconstructed, CPO module copies the values of the Calling Party ID from the received SS7 message. In a particular embodiment, at block 322 the CPO module duplicates the values of the Calling Party ID digits field from the query message in a Calling Party ID digits field within the response message. Next, at block 324, the CPO module duplicates the values of the Calling Party ID nature of address field from the query message in a Calling Party ID nature of address field within the response message.

Moving to block 326, the CPO module duplicates the values of the Calling Party ID numbering plan field from the query message in a Calling Party ID numbering plan field within the response message. At block 328, the CPO module duplicates the values of the Calling Party ID screening indicator field from the query message in a Calling Party ID screening indicator field within the response message. Then, at block 320, the CPO module sets the Calling Party ID privacy indicator in a Analyze_Route response message of the SCP to Presentation Restricted, e.g., to a value of 01. The method then continues to block 314 and the call continues. The method then ends at state 306.

Returning to decision step 310, if the Caller ID service setting for the Toll Free Number is enable, the method proceeds to decision step 330 and the CPO module determines whether the Calling party ID needs to be reconstructed. If so, the method moves to block 332, and the Calling Party ID is reconstructed from a Charge Number, as described in detail in conjunction with FIG. 4. Next, at block 334, the CPO module sets the Calling Party ID privacy indicator in a Analyze_Route response message of the SCP to presentation allowed, e.g., to a value of 00. Thereafter, the method proceeds to block 314 and the call continues. The method then ends at state 306.

Returning to decision step 330, if the Calling party ID does not need to be reconstructed, the CPO module copies the values of the Calling Party ID from the received SS7 message. For example, at block 336 the CPO module duplicates the values of the Calling Party ID digits field from the query message in a Calling Party ID digits field within the response message. Next, at block 338, the CPO module duplicates the values of the Calling Party ID nature of address field from the query message in a Calling Party ID nature of address field within the response message.

Moving to block 340, the CPO module duplicates the values of the Calling Party ID numbering plan field from the query message in a Calling Party ID numbering plan field within the response message. At block 342, the CPO module duplicates the values of the Calling Party ID screening indicator field from the query message in a Calling Party ID screening indicator field within the response message. Continuing to block 334, the CPO module sets the Calling Party ID privacy indicator in a Analyze_Route response message of the SCP to Presentation Allowed, e.g., to a value of 00. Thereafter, the method proceeds to block 314 and the call continues. The method then ends at state 306.

Referring to FIG. 4, a method of reconstructing a Calling Party ID from a Charge Number is shown and commences at decision step 400. At decision step 400, the CPO module determines whether the Charge Number is present in the query message. If not, the method moves to block 402 and an error is returned indicating that no data is available for the CPO module. The method then ends at state 404.

Returning to decision step 400, if the Charge Number is present in the query message, the method continues to block 406 and the CPO module sets a reconstructed Calling Party ID Nature of Address field to "Unique Subscriber Number" when the received Charge Number Nature of Address field has a value of "000 0001." At block 408, the CPO module sets the reconstructed Calling Party ID Nature of Address field to "Unique National Significant Number" when the received Charge Number Nature of Address field has a value of "000 0011." Continuing to block 410, the CPO module sets the Calling Party ID Screening Indicator field to "Network Provided." At block 412, the CPO module sets the Calling Party ID Numbering Plan field to the value within the received Charge Number Numbering Plan field. The method then ends at state 404.

With the configuration of structure described above, the system and method of providing automatic number identification delivery service in an intelligent telephone network allows the recipient of telephone calls from callers that have blocked their caller identification information to override the privacy setting and unblock the caller identification information. A company can subscribe to a caller identification privacy override service and privacy settings can be overridden on weekdays only or within predefined time periods on weekdays, e.g., during normal business hours. As such, the subscriber will not be charged for calls received outside of normal business hours in which privacy settings have been overridden.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of managing calls to a toll free telephone number, the method comprising:
   receiving a telephone call directed to a toll free number;
   determining day that the telephone call is received; and
   modifying a calling party identification (ID) privacy indicator associated with the telephone call, wherein the calling party ID privacy indicator is modified based on the day that the telephone call is received.

2. The method of claim 1, wherein a caller identification is determined after the calling party ID privacy indicator is modified.

3. The method of claim 1, wherein the telephone call is received and the calling party ID privacy indicator is modified on a weekday.

4. The method of claim 1, further comprising determining whether the telephone call is received within a predetermined time range.

5. The method of claim 4, further comprising modifying the calling party ID privacy indicator when the telephone call is received within the predetermined time range.

6. The method of claim 1, further comprising determining whether a caller ID service setting associated with the toll free number is set to one of enable, disable and pass.

7. The method of claim 6, further comprising modifying the calling party ID privacy indicator when the caller ID service setting is set to enable.

8. The method of claim 6, further comprising modifying the calling party ID privacy indicator when the caller ID service setting is set to disable.

9. The method of claim 6, further comprising not modifying the calling party ID privacy indicator when the caller ID service setting is set to pass.

10. A method of modifying a calling party identification (ID) privacy indicator, the method comprising:
    receiving a signaling system 7 (SS7) query message associated with a called telephone number;
    determining whether the called telephone number is a toll free number;
    when the called telephone number is a toll free number, determining a day that a telephone call is made to the toll free number; and
    based on the day that the telephone call is made to the toll free number, selectively modifying one or more parameters in a response message to the SS7 query message in order to allow an identification of a caller based on a caller ID privacy override (CPO) module input, wherein the response message is an analyze route message that includes at least one calling party ID parameter, the at least one calling party ID parameter including at least a calling party ID privacy indicator.

11. The method of claim 10, further comprising determining whether the CPO module input for the called telephone number is one of enable, disable, and pass.

12. The method of claim 10, wherein the at least one calling party ID parameter further includes at least one of a calling party ID digits field, a calling party ID nature of address field, a calling party ID numbering plan field, and a calling party ID screening indicator.

13. The method of claim 10, wherein the SS7 query message includes at least one charge number parameter.

14. The method of claim 13, wherein the at least one charge number parameter includes one of a charge number digits field, a charge number nature of address field, and a charge number numbering plan field.

15. The method of claim 10, further comprising setting the calling party ID privacy indicator in the analyze route message to a presentation restricted value when the CPO module input is disable.

16. The method of claim 10, further comprising setting the calling party ID privacy indicator in the analyze route message to a presentation allowed value when the CPO module input is enable.

17. The method of claim 10, further comprising leaving the calling party ID privacy indicator in the analyze route message as is when the CPO module input is pass.

18. The method of claim 10, further comprising determining whether a called party identification is a valid toll free number.

19. The method of claim 10, further comprising determining whether to reconstruct a calling party ID.

20. The method of claim 12, further comprising duplicating values of the calling party ID digits field from the SS7 query message in a calling party ID digits field within the response message.

21. The method of claim 12, further comprising duplicating values of the calling party ID nature of address field from the SS7 query message to a calling party ID nature of address field within the response message.

22. The method of claim 12, further comprising duplicating values of the calling party ID numbering plan field from the SS7 query message to a calling party ID numbering plan field within the response message.

23. The method of claim 12, further comprising duplicating the values of the calling party ID screening indicator field from the SS7 query message in a calling party ID screening indicator field within the response message.

24. The method of claim 19, further comprising determining whether a charge number is present in the SS7 query message after determining that the calling party ID is to be reconstructed.

25. The method of claim 24, further comprising setting a reconstructed calling party ID nature of address field within the response message to "Unique Subscriber Number" when a charge number nature of address field within the SS7 query message has a value of "000 0001."

26. The method of claim 25, further comprising setting the reconstructed calling party ID nature of address field within the response message to "Unique National Significant Number" when the charge number nature of address field within the SS7 query message has a value of "000 0011".

27. The method of claim 26, further comprising setting a calling party ID screening indicator field within the response message to "Network Provided."

28. The method of claim 27, further comprising duplicating values of a charge number numbering plan field from the SS7 query message in a reconstructed calling party ID numbering plan field within the response message.

29. A telephone system, comprising:
    a service control point;
    a service control point database accessible to the service control point;
    a service switching point;
    a computer program embedded within a computer readable storage medium within the service control point, the computer program comprising:
       instructions to modify a calling party ID privacy indicator within a query message associated with a telephone call to a toll free number;
       instructions to determine a day that the telephone call is made to the toll free number; and instructions to modify the calling party ID privacy indicator based on the day that the telephone call is received.

30. The system of claim 29, wherein the calling party ID privacy indicator is modified on a weekday.

31. The system of claim 29, wherein the calling party ID privacy indicator is not modified on a weekend.

32. The system of claim 29, wherein the computer program further comprises instructions to determine whether the telephone call is received within a predetermined time range, when the telephone call is received on a weekday.

33. The system of claim 32, wherein the computer program further comprises instructions to override the calling party ID privacy indicator when the telephone call is received within the predetermined time range.

* * * * *